(12) United States Patent
Szajewski et al.

(10) Patent No.: US 7,550,039 B2
(45) Date of Patent: Jun. 23, 2009

(54) AQUEOUS INKJET INK COMPOSITION

(75) Inventors: Richard P. Szajewski, Rochester, NY (US); Gang C. Han-Adebekun, Pittsford, NY (US); Paul H. Munger, Hilton, NY (US); Paul D. Zimmerman, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 446 days.

(21) Appl. No.: 11/297,195

(22) Filed: Dec. 8, 2005

(65) Prior Publication Data

US 2007/0132822 A1   Jun. 14, 2007

(51) Int. Cl.
*C09D 11/02* (2006.01)

(52) U.S. Cl. .................................. 106/31.6; 106/31.65
(58) Field of Classification Search ................. 106/31.6
See application file for complete search history.

(56) References Cited

U.S. PATENT DOCUMENTS

| 6,387,168 | B1 | 5/2002 | Koitabashi et al. |
| 6,533,407 | B2 | 3/2003 | Mouri et al. |
| 6,638,350 | B2 | 10/2003 | Butler et al. |
| 6,899,754 | B2 * | 5/2005 | Yeh et al. .................. 106/31.6 |
| 2004/0016365 | A1 | 1/2004 | Sir et al. |
| 2004/0244642 | A1 | 12/2004 | Uji et al. |

FOREIGN PATENT DOCUMENTS

| EP | 0 787 775 | 8/1997 |
| EP | 0 879 857 | 11/1998 |
| EP | 1 146 094 | 10/2001 |
| EP | 1 167 470 | 1/2002 |
| EP | 1 586 610 | 10/2005 |
| WO | 2006/012142 | 2/2006 |

\* cited by examiner

*Primary Examiner*—Helene Klemanski
*Assistant Examiner*—Veronica Faison Gee
(74) *Attorney, Agent, or Firm*—Sarah Meeks Roberts; Arthur E. Kluegel

(57) ABSTRACT

This invention is related to an inkjet ink comprising water, a first self-dispersing pigment, and a second self-dispersing pigment, wherein said first self-dispersing pigment comprises a charged group bonded directly to the surface thereof, and said second self-dispersing pigment comprises a charged group bonded through a linking group to the surface thereof.

18 Claims, No Drawings

AQUEOUS INKJET INK COMPOSITION

FIELD OF THE INVENTION

This invention relates to an aqueous inkjet ink comprising two different classes of self-dispersing pigments.

BACKGROUND OF THE INVENTION

Ink jet printing is a non-impact method for producing printed images by the deposition of ink droplets in a pixel-by-pixel manner to an image-recording element in response to digital data signals. There are various methods that may be utilized to control the deposition of ink droplets on the image-recording element to yield the desired printed image. In one process, known as drop-on-demand ink jet, individual ink droplets are projected as needed onto the image-recording element to form the desired printed image. Common methods of controlling the projection of ink droplets in drop-on-demand printing include piezoelectric transducers and thermal bubble formation. In another process, known as continuous ink jet, a continuous stream of droplets is charged and deflected in an image-wise manner onto the surface of the image-recording element, while un-imaged droplets are caught and returned to an ink sump. Ink jet printers have found broad applications across markets ranging from desktop document and photographic-quality imaging, to short run printing and industrial labeling.

The inks used in the various inkjet printers can be classified as either dye-based or pigment-based. A dye is a colorant that is dissolved in the carrier medium. A pigment is a colorant that is insoluble in the carrier medium, but is dispersed or suspended in the form of small particles. These small particles can be stabilized against flocculation and settling by the use of distinct dispersing agents such as surfactants, oligomers or polymers, or they can be directly functionalized to provide a self-dispersing characteristic. In either case the carrier medium can be a liquid or a solid at room temperature. Commonly used carrier media include water, mixtures of water and organic co-solvents and high boiling organic solvents, such as hydrocarbons, esters, ketones, alcohols and ethers.

Pigment-based inkjet inks are often preferred over dye-based inkjet inks because of the superior image stability typically observed with the pigment-based inks. Self-dispersed pigments in turn are often preferred over surfactant-dispersed, oligomer-dispersed or polymer-dispersed pigments because of their greater stability to a variety of ink formulations and environmental keeping conditions.

Key attributes for ink jet printing on plain papers with inkjet technology include high print density, sharp text quality and high print durability such as high resistance to water, rub and highlighter smear for the printed document on plain paper. Equally important is printing quality uniformity across a large variety of plain papers. It is well known that when printing on plain paper via ink jet vehicle, performance, such as print density, is very sensitive to paper type. Paper type in turn is affected by the paper formulation (e.g. size agent type and amount, filler type and amount, etc.), the manufacturing process, and paper pulp variation. It is highly desirable to have ink formulations that can provide excellent and uniform print quality with low paper to paper variability. In addition, jetting performance of the ink is equally important. This includes, for example, forming stable drops, robust jetting at the desired firing frequency, and maintaining the jetting performance, e.g. constant drop velocity during the extended print head life cycle. Needless to say, inks containing self-dispersed pigments have to date failed to provide all the desired attributes of an ink-jet ink intended for use on plain papers.

Various improvements have been proposed by workers in the field. U.S. Pat. No. 6,638,350B2 describes an ink containing a mixture of self-dispersed pigment and a dye. However, due to the presence of dye in the ink, images printed will suffer image durability, especially with regard to waterfastness. U.S. Pat. No. 6,387,168B1, U.S. Pat. No. 6,533,407B2 and U.S. Applications 2004/0016365A1 describe a pigment based ink containing a mixture of a self-dispersible pigment and a pigment stabilized by a polymeric dispersant. However, the presence of the polymeric dispersant makes the ink viscous and slow to dry. The ink also lacks long term robust firing, especially through a thermal print head.

Therefore, there is clearly a need to provide a pigmented ink composition which can provide laser like print density and text sharpness on plain paper. Said composition also requires good image durability, such as good waterfastness. Additionally, there is a need for ink compositions which, when employed in ink jet printing processes, exhibit stable long-term drop velocity and steady transit time.

SUMMARY OF THE INVENTION

This invention provides an inkjet ink comprising water, a first self-dispersing pigment and a second self-dispersing pigment, wherein said first self-dispersing pigment comprises a charged group bonded directly to the surface thereof, and said second self dispersing pigment comprises a charged group bonded through a linking group to the surface thereof. In one embodiment the ink is a black ink comprising carbon black pigments. This invention further provides an inkjet ink set comprising distinct cyan, magenta, yellow and black inks wherein at least one of said inks comprises an aqueous ink jet ink composition; comprising a first self-dispersing pigment, and a second self-dispersing pigment, wherein said first self-dispersing pigment comprises a charged group bonded directly to the surface thereof, and said second self-dispersing pigment comprises a charged group bonded through a linking group to the surface thereof. The invention further comprises a method of printing using said ink.

The inks have improved print density on plain paper, good text quality, improved print durability such as waterfastness and excellent jetting performance over an extended printing period. They further provide good print uniformity over a wide variety of ink jet receivers.

DETAILED DESCRIPTION OF THE INVENTION

A self-dispersing pigment means a pigment that retains a state stably dispersed in water, a water-soluble organic solvent or a liquid mixture thereof without using any dispersing agent such as a water-soluble polymeric compound. It further does not generate aggregates among pigment particles which may interfere with normal ink ejection from orifices using an ink-jet printing technique. In general, there exists two classes of self-dispersing pigments depending on the linkage of the hydrophilic group to the pigment surface. The first class has a charged (also called hydrophilic) group being bonded directly to the surface of the pigment, and the second class has a charged group being bonded through a linking group to the surface of the pigment. This invention provides an ink jet ink using both classes of self-dispersing pigments in the same ink composition.

The first self-dispersed pigment is preferably, for example, a pigment in which at least one charged group, such as anionic group, has been bonded directly to the surface of the pigment. Preparation of such pigments is well known in the art. Karl, et al., in U.S. Pat. No. 6,503,311 B1 and Yeh et al., in U.S. Pat. No. 6,852,156 B2, have described anionic self-dispersed pigments prepared by ozone oxidation. Ito et al., in U.S. Pat. No. 6,488,753 B1 and Momose et al., in EP 1,479,732 A1, describe anionic self-dispersed pigments prepared by hypochlorite oxidation. Related disclosures occur in U.S. Pat. Nos. 5,609,671, 5,846,307, 5,861,447, 6,099,632, and 6,468,342. The above disclosures are incorporated herein by reference. Additional peroxo acid oxidations methods are disclosed in JP 2004-230134, JP 2004-107513, JP 2004-224955 and JP 2003-183541. Papirer et al., Carbon, Vol. 34, No. 12, pages 1521 to 1529 (1996) discloses and reviews several additional methods of direct functionalization of carbon surfaces. When applied to pigments, these procedures introduce surface bound hydrophilic or charged groups on the pigment to form self-dispersing pigments comprising a hydrophilic group bonded directly to the surface thereof that are suitable for use in an ink-jet ink as the first self-dispersed pigment of the invention.

The surface modification may be carried out by bonding at least one hydrophilic functional group, selected from, for example, the group consisting of carboxyl, carbonyl, hydroxyl, sulfone, and phosphoric acid groups and quaternary ammonium, or a salt thereof, onto the surface of the pigment through at least one group selected from the group consisting of alkyl, alkyl ether, and aryl groups. More specifically, this surface-modified carbon black may be prepared by grafting a functional group or a molecule containing a functional group onto the surface of carbon black by physical treatment, such as vacuum plasma, or chemical treatment (for example, oxidation with hypochlorous acid, sulfonic acid or the like). According to the present invention, the surface-modified pigment is preferably one produced by a method involving wet oxidation with a hypohalous acid or a salt thereof. Hypohalous acids or salts thereof include sodium hypochlorite, potassium hypochlorite, sodium hypobromite, and potassium hypobromite. Among them, sodium hypochlorite is particularly preferred from the viewpoints of reactivity and cost. Specifically, the method involving wet oxidation with a hypohalous acid or a salt thereof may be carried out as follows.

A pigment and a surface modifier (for example, sodium hypochlorite) are heated and dispersed or stirred in a suitable amount of water. For example, a ball mill, an attritor, a colloid mill, or a sand mill with glass, zirconia, alumina, stainless steel, magnetic or other beads added thereto may be used for stirring. In this case, preferably, the pigment may be previously ground. Alternatively, the pigment may be reacted with the surface modifier while grinding the pigment. The grinding may be carried out by means of a rotary homogenizer or an ultrasonic homogenizer. Beads and coarse particles are separated from the dispersion after stirring and oxidation, followed by the removal of by-products of the oxidizing agent to perform purification. Thus, an aqueous pigment dispersion is obtained. If necessary, for example, concentration by a separation membrane or the like, filtration through a metallic filter or a membrane filter, classification by centrifugation, or neutralization with a hydroxide of an alkali metal salt or an amine may be carried out. A modified carbon black produced by the hypohalous oxidation method generally as described by Ito et al., in U.S. Pat. No. 6,488,753 B1 and related publications has a high surface carboxylic acid content. As a result, the dispersibility of the modified carbon black in water is very high. Commercially available products may be used as the above pigment, and preferred examples thereof include Bonjet CW-1, Bonjet CW-2 and Bonjet CW-3 manufactured by Orient Chemical Industries, Ltd.

The second self-dispersed pigment is preferably, for example, a pigment in which at least one hydrophilic group, such as an anionic group or cationic group have been bonded through a linking group to the pigment surface. Generally, a chemical modification is commonly applied in the process. Bergemann, et al., in U.S. Pat. No. 6,758,891 B2 describe the covalent functionalization of pigments by reaction with organic triazoles. Bergemann, et al., in U.S. Pat. No. 6,660,075 B2 further describe the covalent functionalization of pigments by reaction with unsaturated organic compounds. Belmont in U.S. Pat. No. 5,554,739, Adams and Belmont in U.S. Pat. No. 5,707,432, Johnson and Belmont in U.S. Pat. Nos. 5,803,959 and 5,922,118 and in published applications WO 96/18695, WO 96/18696, WO 96/18689, WO 99/51690, WO 00/05313, and WO 01/51566 describe the covalent functionalization of pigments with diazonium compounds. Like preparations of covalently functionalized self-dispersed pigments are additionally described by Osumi et al., in U.S. Pat. No. 6,280,513 B1 and U.S. Pat. No. 6,506,239 B1. Karl et al in U.S. Pat. No. 6,780,389 describe related diazonium induced surface attachment preparations. The disclosures of the above patents are incorporated herein by reference. These publications further describe the preparation and use of ink-jet inks employing the described self-dispersed pigments. Both anionic and cationic self-dispersed pigments are described. Papirer et al., Carbon, Vol. 34, No. 12, pages 1521 to 1529 (1996) discloses and reviews several additional methods of direct functionalization of carbon surfaces. When applied to pigments, these procedures introduce hydrophilic or charged groups on the pigment to form a self-dispersed pigment comprising a hydrophilic or charged group bonded through a linking group to the surface thereof suitable for use in ink-jet ink as the second self-dispersed pigment of the invention. Preferred linking groups are optionally substituted aliphatic groups having 2 to 8 carbon atoms and optionally substituted aromatic groups having 6 to 14 carbon atoms. Phenyl groups are particularly useful as linking groups. Preferred anionic charged groups are chosen from the group consisting of carboxylic, phosphonic, boronic and sulfonic acid groups. Preferred cationic charged groups are chosen from the group consisting of optionally substituted ammonium and phosphonium groups.

One preferred method is treatment of, for example, a carbon black pigment with aryl diazonium salts containing at least one acidic functional group. Examples of aryl diazonium salts include those prepared from sulfanilic acid, 4-aminobenzoic acid, 4-aminosalicylic acid, 7-amino-4-hydroxy-2-naphthylenesulfonic acid, aminophenyl-boronic acid, aminophenylphosphonic acid, and metalinic acid. Ammonium, quaternary ammonium groups, quaternary phosphonium groups, and protonated amine groups represent examples of cationic groups that can be attached to the same organic groups discussed above. Self-dispersing pigments of this class are also commercially available from Cabot as Cab-O-Jet® 200 and Cab-O-Jet® 300. While both anionic and cationic charged self-dispersed pigments are known and can be employed in the practice of the invention, anionic, i.e. negatively charged self-dispersed pigments are preferred. In one embodiment of the invention at least one, and preferably both of the first and second pigments are carbon black.

The following water-insoluble pigments are among those useful as substrates suitable for chemical modification as described previously into the first or second pigment in the practice of the invention; however, this listing is not intended to limit the invention. The following pigments are available from Cabot: Monarch® 1400, Monarch® 1300, Monarch® 1100, Monarch® 1000, Monarch® 900, Monarch® 880, Monarch® 800, and Monarch® 700. The following pigments are available from Ciba-Geigy: Igralite® Rubine 4BL. The following pigments are available from Columbian: Raven 7000, Raven 5750, Raven 5250, Raven 5000, and Raven 3500. The following pigments are available from Degussa: Color Black FW 200, Color Black FW 2, Color Black FW 2V, Color Black FW 1, Color Black FW 18, Color Black S 160, Color Black S 170, Special Black 6, Special Black 5, Special Black 4A, Special Black 4, Printex U, Printex V, Printex 140U, and Printex 140V. The following pigment is available from DuPont: Tipure® R-101. The following pigment is available from Hoechst: Permanent Rubine F6B. The following pigment is available from Sun Chemical: LHD9303 Black.

In this invention, it was found that when the dispersions from the two separate classes are mixed, ink made from the dispersion mixture showed surprisingly advantaged performance as compared to inks made from dispersions of each class separately. According to the present invention, the weight ratio of the first self-dispersed pigment dispersions to the second self-dispersed pigment dispersion can be any ratio enabling realization of the desired results. First pigment to second pigment weight-ratios of 99:1 to 1:99 are contemplated, 98:2 to 2:98 are preferred, 97:3 to 30:70 are more preferred and 94:4 to 40:60 are most preferred. The first self-dispersed pigment dispersion can be present in an amount of 0.01 to 10 weight %, and the second self-dispersed pigment dispersion can be present in an amount of 0.01 to 10 weight %, both based on the total weight of the ink.

According to a preferred embodiment of the present invention, in the pigment-based black ink of the present invention, the first pigment dispersion can be present in an amount of 0.01 to 10 weight %, and the second pigment dispersion can be present in an amount of 0.01 to 10 weight %, both based on the total weight of the ink. The pigment-based black ink of the present invention has a higher optical density than ink containing the same weight % of the either first self dispersed pigment or second self-dispersed pigment individually. In addition, the drop velocity drop after extended jetting for the ink of the present invention is much less as compared to the inks made from individual dispersion with the linear interpretation. This result is unexpected based on linear relationship of the mixture property from its parent components.

The total pigment used in the inks of the invention is present in the ink jet ink in any effective amount, generally from about 0.1 to about 10% by weight, and preferably from about 0.5% to about 8% by weight. It is further preferred that the total pigment is from about 1.0% to about 6.0% by weight.

The pigment particles useful in the invention may have any particle sizes which can be jetted through a print head. Preferably, 50 weight % of the pigment particles have a particle size of less than about 0.5 micron, more preferably less than about 0.2 micron. Preferably 90 weight % of the pigment particles have a particle size of less than 2.0 microns, and more preferably less than 500 nm, and most preferably less than 200 nm.

In one embodiment at least one of the first and second self-dispersed pigments has a charge equivalence of at least 0.5 mEq/g. Preferably, at least one of the first and second self-dispersed pigment has an anionic charge and has an acid equivalence of 0.5 to 3 mEq/g. It is especially preferred that both the first and second self-dispersed pigments have an acid equivalence of 0.5 to 3 mEq/g. In one embodiment the ink further comprises an ammonium counterion content of 0.01 to 0.5% by weight.

Preferably the ink inventive ink is part of an inkjet ink set comprising distinct cyan, magenta, yellow and black inks. More preferably the ink comprising the first and second self-dispersing pigments is the black ink and the pigments are carbon black.

Surfactants may be added to adjust the surface tension of the ink to an appropriate level. The surfactants may be anionic, cationic, amphoteric or nonionic and used at levels of 0.01 to 5% of the ink composition. Examples of suitable nonionic surfactants include, linear or secondary alcohol ethoxylates (such as the Tergitol® 15-S and Tergitol® TMN series available from Union Carbide and the Brij® series from Uniquema), ethoxylated alkyl phenols (such as the Triton® series from Union Carbide), fluoro surfactants (such as the Zonyls® from DuPont; and the Fluorads® from 3M), fatty acid ethoxylates, fatty amide ethoxylates, ethoxylated and propoxylated block copolymers (such as the Pluronic® and Tetronic® series from BASF, ethoxylated and propoxylated silicone based surfactants (such as the Silwet® series from CK Witco), alkyl polyglycosides (such as the Glucopons® from Cognis) and acetylenic polyethylene oxide surfactants (such as the Surfynols from Air Products).

Examples of anionic surfactants include; carboxylated (such as ether carboxylates and sulfosuccinates), sulfated (such as sodium dodecyl sulfate), sulfonated (such as dodecyl benzene sulfonate, alpha olefin sulfonates, alkyl diphenyl oxide disulfonates, fatty acid taurates and alkyl naphthalene sulfonates), phosphated (such as phosphated esters of alkyl and aryl alcohols, including the Strodex® series from Dexter Chemical), phosphonated and amine oxide surfactants and anionic fluorinated surfactants. Examples of amphoteric surfactants include; betaines, sultaines, and aminopropionates. Examples of cationic surfactants include; quaternary ammonium compounds, cationic amine oxides, ethoxylated fatty amines and imidazoline surfactants. Additional examples are of the above surfactants are described in "McCutcheon's Emulsifiers and Detergents: 1995, North American Editor".

Jet velocity, separation length of the droplets, drop size and stream stability are greatly affected by the surface tension and the viscosity of the ink. The ink jet inks suitable for use with ink jet printing systems and to apply to non-absorbing substrates, especially high surface energy hydrophobic surfaces, should have a surface tension in the range of about 20 dynes/cm to about 60 dynes/cm and, more preferably, in the range 20 dynes/cm to about 50 dynes/cm. Control of surface tensions in aqueous inks is accomplished by additions of small amounts of surfactants. The level of surfactants to be used can be determined through simple trial and error experiments, usually about 0.01% to about 6%, preferably, 0.1% to about 2% by weight of the total ink composition. Anionic, cationic and nonionic surfactants may be selected from those disclosed in U.S. Pat. Nos. 5,324,349; 4,156,616 and 5,279,654 as well as many other surfactants known in the ink jet ink art. Commercial surfactants include the Surfynols® from Air Products; the Zonyls® from DuPont and the Fluorads® from 3M.

The ink has physical properties compatible with a wide range of ejecting conditions, i.e., driving voltages and pulse widths for thermal ink jet printing devices, driving frequencies of the piezo element for either a drop-on-demand device or a continuous device, and the shape and size of the nozzle. The exact choice of ink components will depend upon the specific application and performance requirements of the print head from which they are jetted. Thermal and piezoelectric drop-on-demand print heads and continuous print heads each require ink compositions with a different set of physical properties in order to achieve reliable and accurate jetting of the ink, as is well known in the art of inkjet printing. Acceptable viscosities are no greater than 20 cP, and preferably in the range of about 1.0 to 6.0 cP and most preferably in the range of 1.5 and 3 cP. The ink jet inks useful in the invention typically exhibit a solution density of between 1 and 1.2 g/cc.

A biocide (0.01-1.0% by weight) may also be added to prevent unwanted microbial growth which may occur in the ink over time. A preferred biocide for the inks employed in the present invention is Proxel® GXL (Zeneca Colours Co.) at a concentration of 0.05-0.1% by weight or/and Kordek® (Rohm and Haas Co.) at a concentration of 0.05-0.1% by weight (based on 100% active ingredient. Additional additives which may optionally be present in an ink jet ink composition include thickeners, conductivity enhancing agents, anti-kogation agents, drying agents, waterfast agents, dye solubilizers, chelating agents, binders, light stabilizers, viscosifiers, buffering agents, anti-mold agents, anti-curl agents, stabilizers and defoamers.

The pH of the aqueous ink compositions of the invention may be adjusted by the addition of organic or inorganic acids or bases. Useful inks may have a preferred pH of from about 4 to 10, depending upon the type of pigment being used. Preferably, the pH of the present ink is from 5 to 9. More preferably from 5.5 to 7.5. Typical inorganic acids include hydrochloric, phosphoric and sulfuric acids. Typical organic acids include methanesulfonic, acetic and lactic acids. Typical inorganic bases include alkali metal hydroxides and carbonates. Typical organic bases include ammonia, triethanolamine and tetramethylethlenediamine.

Ink compositions useful in the invention include humectants and/or co-solvents in order to prevent the ink composition from drying out or crusting in the nozzles of the printhead, aid solubility of the components in the ink composition, or facilitate penetration of the ink composition into the image-recording element after printing. Representative examples of humectants and co-solvents used in aqueous-based ink compositions include (1) alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; (2) polyhydric alcohols, such as ethylene glycol, diethylene glycol, triethylene glycol, tetraethylene glycol, propylene glycol, polyethylene glycol, polypropylene glycol, 1,2-propane diol, 1,3-propane diol, 1,2-butane diol, 1,3-butane diol, 1,4-butane diol, 1,2-pentane diol, 1,5-pentanediol, 1,2-hexanediol, 1,6-hexane diol, 2-methyl-2,4-pentanediol, 1,2-heptane diol, 1,7-hexane diol, 2-ethyl-1,3-hexane diol, 1,2-octane diol, 2,2,4-trimethyl-1,3-pentane diol, 1,8-octane diol, glycerol, 1,2,6-hexanetriol, 2-ethyl-2-hydroxymethyl-propane diol, saccharides and sugar alcohols and thioglycol; (3) lower mono- and di-alkyl ethers derived from the polyhydric alcohols; such as, ethylene glycol monomethyl ether, ethylene glycol monobutyl ether, ethylene glycol monoethyl ether acetate, diethylene glycol monomethyl ether, diethylene glycol monobutyl ether, polyethylene glycol monobutyl ether and diethylene glycol monobutyl ether acetate; (4) nitrogen-containing compounds such as urea, 2-pyrrolidone, N-methyl-2-pyrrolidone, and 1,3-dimethyl-2-imidazolidinone; and (5) sulfur-containing compounds such as 2,2'-thiodiethanol, dimethyl sulfoxide and tetramethylene sulfone. Typical aqueous-based ink compositions useful in the invention may contain, for example, the following components based on the total weight of the ink: water 20-95%, humectant(s) 5-70%, and co-solvent(s) 2-20%.

Ink jet printing is a non-impact method for producing printed images by the deposition of ink droplets in a pixel-by-pixel manner to an image-recording element in response to digital data signals. There are various methods that may be utilized to control the deposition of ink droplets on the image-recording element to yield the desired printed image. In one process, known as drop-on-demand ink jet, individual ink droplets are projected as needed onto the image-recording element to form the desired printed image. Common methods of controlling the projection of ink droplets in drop-on-demand printing include piezoelectric transducers and thermal bubble formation. In another process, known as continuous ink jet, a continuous stream of droplets is charged and deflected in an image-wise manner onto the surface of the image-recording element, while un-imaged droplets are caught and returned to an ink sump. Ink jet printers have found broad applications across markets ranging from desktop document and photographic-quality imaging, to short run printing and industrial labeling. Ink jet printing methods, and related printers, are commercially available and need not be described in detail. In one embodiment the inks of the current invention are preferably utilized in a thermal printer.

The inks of the invention are preferably utilized in an ink jet set comprising at least magenta, cyan, yellow and black inks. Colorless ink compositions that contain non-colored particles and no colorant may also be used. Colorless ink compositions are often used in the art as "fixers" or insolubilizing fluids that are printed under, over, or with colored ink compositions in order to reduce bleed between colors and waterfastness on plain paper; see for example, U.S. Pat. No. 5,866,638 or U.S. Pat. No. 6,450,632 B1. Colorless inks are also used to provide an overcoat to a printed image, usually in order to improve scratch resistance and waterfastness; see for example, U.S. 2003/0009547 A1 or E.P. 1,022,151 A1. Colorless inks are also used to reduce gloss differential in a printed image; see for example, U.S. Pat. No. 6,604,819 B2; U.S. 2003/0085974 A1; U.S. 2003/0193553 A1; or U.S. 2003/0189626 A1.

The process of the present invention can be employed with a wide variety of recording media, including plain papers such as Xerox® 4024 papers, including Ashdown 4024 DP, Cortland 4024 DP, Champion 4024 DP, Xerox® 4024 D.P. green, Xerox® 4024 D.P. pink, Xerox® 4024 D.P yellow, and the like, Xerox® 4200 papers, Xerox® 10 series paper, Xerox® Imaging Series LX paper, canary ruled paper, ruled notebook paper, bond paper such as Gilbert 25 percent cotton bond paper, Gilbert 100 percent cotton bond paper, and Strathmore bond paper, recycled papers, silica coated papers such as Sharp Company silica coated paper, Jujo® paper, Georgia-Pacific ink jet Paper Catalog Number 214305N, Kodak bright white ink jet paper, Hewlett Packard Color ink jet paper, Xerox Extra Bright white ink jet paper, Georgia-Pacific ink jet Paper Catalog Number 999013, Staples ink jet paper International Paper Great White MultiUse 20 Paper, 8) Xerox Premium Multipurpose Paper, Hammermill Copy plus or ForeMP paper, and Hewlett Packard Multipurpose paper, glossy papers, and the like, transparency materials such as Xerox® 3R3351 ink jet transparencies, Tetronix ink jet transparencies, Arkright ink jet transparencies, Hewlett-Packard ink jet transparencies, and the like, fabrics, textile products, plastics, polymeric films, inorganic substrates such as metals and wood, and the like.

The following examples illustrate, but do not limit, the utility of the present invention.

EXAMPLES

Example I

Black Inks by Mixing Class I Self-Dispersed Carbon Black and Class 2 Self-Dispersed Carbon Black Dispersions at Different Ratios (Formulation A)

Ink Formulation

Black Ink 1a of the Invention (I-1a)

To prepare the Ink I-1a, 25.1 g of first self-dispersed carbon black dispersion Bonjet CW-2 from Orient Corp (15.2 wt % active), 1.33 g of second self-dispersed carbon black dispersion Cabojet 300 from Cabot corp (15 wt % active), 7.0 g of diethylene glycol, 11.7 g of glycerol, 1.43 g of polyethylene glycol 400 (Dow Corp), 1.5 g of acetylene glycol surfactant Surfynol 465 from Air Product Corp (Diluted to 10% wt) and 0.33 g of lactic acid (diluted to 3% wt) were added together with distilled water so that the final weight of the ink was 100.0 g. The final ink contained 4% carbon black (3.8% of first class self-dispersed carbon black and 0.2% second class self-dispersed carbon black), 7% diethylene glycol, 11.7% glycerol, 1.43% polyethylene glycol 400, 0.15% Surfynol 465 and 0.01% lactic acid. The solution was filtered through a 1.2 μm polytetrafluoroethylene filter. The resulting ink had the following physical properties: a surface tension of 39.0 dynes/cm at room temperature, a viscosity of 1.83 cps at room temperature, and a pH of 6.96. The 50% and 95% particle sizes of the ink were about 169 nm and 306 nm as measured by MICROTRAC II Ultrafine particle analyzer (UPA) manufactured by Leeds & Northrup.

Black Ink 1b of the Invention (I-1b)

Ink I-1b of the present invention was prepared similarly to Ink I-1a except that 23.8 g of first self-dispersed carbon black Bonjet CW-2 (15.2 wt % active), and 2.7 g of second self-dispersed carbon black Cabojet 300 (15 wt % active), were added so that the final ink contained 3.6% of the first class self-dispersed carbon black and 0.4% of the second class self-dispersed carbon black, with the total carbon black remaining the same at 4%. The resulting ink had the following physical properties: a surface tension of 39.0 dynes/cm at room temperature, a viscosity of 1.82 cps at room temperature, and a pH of 7.03. The 50% and 95% particle sizes of the ink were about 172 nm and 306 nm as measured by MICROTRAC II Ultrafine particle analyzer (UPA) manufactured by Leeds & Northrup Black Ink 1c of the Invention (I-1c)

Ink I-1c of the present invention was prepared similarly to Ink I-1a except that 19.8 g of first self-dispersed carbon black Bonjet CW-2 (15.2 wt % active), and 6.67 of second self-dispersed carbon black Cabojet 300 (15 wt % active), were added so that the final ink contained 3.0% of the first class self-dispersed carbon black and 1.0% of the second class self-dispersed carbon black, with the total carbon black remains the same at 4%. The resulting ink has the following physical properties: a surface tension of 39.0 dynes/cm at room temperature, a viscosity of 1.82 cps at room temperature, and a pH of 7.03. The 50% and 95% particle sizes of the ink were about 172 nm and 306 nm as measured by MICROTRAC II Ultrafine particle analyzer (UPA) manufactured by Leeds & Northrup Comparative Ink 1a (C-1a)

Comparative Ink C-1a was prepared similarly to Ink-1a except that only 26.7 of second self-dispersed carbon black Cabojet 300 (15 wt % active) was added so that the final ink contained 0% of the first class self-dispersed carbon black and 4.0% of the second class self-dispersed carbon black, with the total carbon black remains the same at 4%. The resulting ink has the following physical properties: a surface tension of 46 dynes/cm at room temperature, a viscosity of 2.0 cps at room temperature, and a pH of 7.54. The 50% and 95% particle sizes of the ink were about 104 nm and 209 nm as measured by MICROTRAC II Ultrafine particle analyzer (UPA) manufactured by Leeds & Northrup.

Comparative Ink 1b (C-1b)

Comparative Ink C-1b was prepared similarly to Ink-1a except that only 26.7 of the first self-dispersed carbon black Bonjet CW-2 (15.2 wt % active) was added so that the final ink contained 4% of the first class self-dispersed carbon black and 0% of the second class self-dispersed carbon black, with the total carbon black remains the same at 4%. The resulting ink has the following physical properties: a surface tension of 38.4 dynes/cm at room temperature, and a viscosity of 1.8 cps at room temperature. The 50% and 95% particle sizes of the ink were about 158 nm and 300 nm as measured by MICROTRAC II Ultrafine particle analyzer (UPA) manufactured by Leeds & Northrup.

Plain Paper Performance Evaluation

Inks of the present invention were filled into printer compatible empty cartridges and printing was done with a Canon i960 thermal ink jet printer. A solid area of 1 inch by 1 inch at 100% dot coverage was printed at 2 pass, bidirectional mode on 10 plain papers. The Status A reflection densities of the printed patches of all the 10 papers were measured using a sectoring densitometry. Since the print density is very paper sensitive and the objective was lowest paper to paper variability, two parameters were chosen to be the representative print quality attributes for each ink under evaluation. They were 1) Average print density across 10 papers, and 2) Print density range (Maximum print density—minimum print density) among the 10 papers. They are listed in Table 1. The 10 papers used for evaluation were: 1) Georgia-Pacific ink jet Paper Catalog Number 214305N, 2) Kodak bright white ink jet paper, 3) Hewlett Packard Color ink jet paper, 4) Xerox Extra Bright white ink jet paper, 5) Georgia-Pacific ink jet Paper Catalog Number 999013, 6) Staples ink jet paper 7) International Paper Great White MultiUse 20 Paper, 8) Xerox Premium Multipurpose Paper, 9) Hammermill ForeMP paper, and 10) Hewlett Packard Multipurpose paper.

Jetting Performance Evaluation

Inks of the present invention were evaluated on a drop performance fixture apparatus having a thermal printhead with 640 nozzles at 1200 dpi. The operating voltage for the printhead was held at about 10 percent over the threshold voltage (minimum voltage needed to cause ejection of an ink droplet) of the printhead. The transit time for a drop of ink traveling to a distance of 0.3 mm was recorded based on the signal captured by the laser detector. The drop velocity is then calculated based on the transit time. Under the above conditions, inks of the present inventions were fired at 10,000 Hz from 4 adjacent nozzles for up to 1.5E8 firing events. Drop velocity of all the four nozzles was measured at an interval of 1E6 firing events. The drop velocity at less or equal 1E6 firing events was selected as the initial drop velocity ($V_{initial}$). The drop velocity at 1.5E8 firing events was selected as the final drop velocity ($V_{final}$). The % of velocity drop was calculated from equation: $(V_{initial}-V_{final})/V_{initial}*100$. To illustrate the synergetic effect observed when the two classes of self-dispersed carbon dispersion were mixed rather than just a simple mixing effect, a theoretical final drop velocity $V_{final}$ (linear interpolation) was calculated using the equation $V_{final}$ (linear interpolation)=(wt % Dispersion 1×$V_{final}$ (100% Dispersion 1)+wt % Dispersion 2×$V_{final}$ (100% Dispersion 2))/(wt % Dispersion 1+wt % Dispersion 2). The % of velocity drop was then calculated using the $V_{final}$ (linear interpolation). These are shown in Table 1.

ene filter. The resulting ink has the following physical properties: a surface tension of 43.2 dynes/cm at room temperature, a viscosity of 1.70 cps at room temperature, and a pH of 8.37. The 50% and 95% particle sizes of the ink were about 155 nm and 307 nm as measured by MICROTRAC II Ultrafine particle analyzer (UPA) manufactured by Leeds & Northrup.

TABLE 1

Print Quality And Velocity Drop for Inks In Example I

| Inks | Print Quality | | Velocity Drop % | |
|---|---|---|---|---|
| (wt % Dispersion 1-wt % Dispersion 2) | Average Print Density | Density Range | Measured | Linear interpolation of wt % of two dispersions |
| Inventive Ink I-1a (3.8% D1-0.2% D2) | 1.47 | 0.16 | 24.2% | 31.7% |
| Inventive Ink I-1b (3.6% D1-0.4% D2) | 1.47 | 0.14 | 17.1% | 34.0% |
| Inventive Ink I-1c (3.0% D1-1.0% D2) | 1.46 | 0.09 | 17.4% | 28.1% |
| Comparative Ink C-1a (0% D1-4.0% D2) | 1.34 | 0.18 | 37.1% | |
| Comparative Ink C-1b (4.0% D1-0% D2) | 1.46 | 0.22 | 3.0% | |

The above results show that the black inks with mixing of two classes of self-dispersed carbon black dispersions (elements of the invention) had much improved print quality (high print density and low paper to paper variability combination) as compared to black inks with a pure self-dispersed carbon black of either class at the same total carbon black weight composition (the control elements). The above results also show that with respect to velocity drop, the black inks made from mixing two classes of self-dispersed carbon blacks have much less velocity drop, as compared to those when calculated based on simple linear interpolation. Clearly the observed advantages are synergetic, rather than just by simple mixing. These results were unexpected by the inventors.

Example II

Black Inks by Mixing Class I Self-Dispersed Carbon Black Dispersion and Two Different Types of Class 2 Self-Dispersed Carbon Black (Formulation B)

Ink Formulation

Black Ink 2A$_1$ of the Invention (I-2A$_1$)

To prepare the Ink I-2A$_1$, 20.0 g of first self-dispersed carbon black dispersion Bonjet CW-2 from Orient Corp (15.2 wt % active), 6.67 g of second self-dispersed carbon black dispersion Cabojet 300 from Cabot corp (15 wt % active), 18.0 g of diethylene glycol, 1. g of acetylene glycol surfactant Surfynol 465 from Air Product Corp (Diluted to 10% wt) and 0.5 g of Triethynolamine (diluted to 20% wt) were added together with distilled water so that the final weight of the ink was 100.0 g. The final ink contained 4% carbon black (3% of the first class self-dispersed carbon black and 1% of the second class self-dispersed carbon black), 18% diethylene glycol, 0.1% Surfynol 465 and 0.1% Triethynolamine. The solution was filtered through a 1.2 μm polytetrafluoroethyl- Black Ink 2A$_2$ of the Invention (I-2A$_2$)

Ink I-2A$_2$ of the present invention was prepared similarly to Ink I-2A$_1$ except that 13.3 g of first self-dispersed carbon black Bonjet CW-2 (15 wt % active), and 13.3 g of second self-dispersed carbon black Cabojet 300 (15 wt % active), were added so that the final ink contained 2.0% of the first class self-dispersed carbon black and 2.0% of the second class self-dispersed carbon black, with the total carbon black remains the same at 4%. The resulting ink has the following physical properties: a surface tension of 44.4 dynes/cm at room temperature, a viscosity of 1.56 cps at room temperature, and a pH of 8.36. The 50% and 95% particle sizes of the ink were about 145 nm and 257 nm as measured by MICROTRAC II Ultrafine particle analyzer (UPA) manufactured by Leeds & Northrup Black Ink 2B$_1$ of the Invention (I-2B$_1$)

Ink I-2B$_1$ of the present invention was prepared similar to Ink I-2A$_1$ except that 6.67 g of Class 2 self-dispersed carbon black dispersion X (15 wt % active) were added instead of Cabojet 300. Self-dispersed carbon black dispersion X had about twice the extent of a similar surface modification as CaboJet-300. The final ink contained 3.0% of the first class self-dispersed carbon black and 1.0% of the second class self-dispersed carbon black, with the total carbon black remains the same at 4%. The resulting ink has the following physical properties: a surface tension of 44.4 dynes/cm at room temperature, a viscosity of 1.73 cps at room temperature, and a pH of 8.44. The 50% and 95% particle sizes of the ink were about 139 nm and 282 nm as measured by MICROTRAC II Ultrafine particle analyzer (UPA) manufactured by Leeds & Northrup Black Ink 2B$_2$ of the Invention (I-2B$_2$)

Ink I-2B$_2$ of the present invention was prepared similar to Ink I-2A$_2$ except that 13.34 g of Class 2 self-dispersed carbon black dispersion X (15 wt % active) were added instead of Cabojet 300. The final ink contained 2.0% of the first class self-dispersed carbon black and 2.0% of the second class self-dispersed carbon black, with the total carbon black remains the same at 4%. The resulting ink has the following physical properties: a surface tension of 44.4 dynes/cm at room temperature, a viscosity of 1.58 cps at room temperature, and a pH of 8.64. The 50% and 95% particle sizes of the ink were about 150 nm and 281 nm as measured by MICROTRAC II Ultrafine particle analyzer (UPA) manufactured by Leeds & Northrup Comparative Ink 2ab (C-2ab)

Comparative Ink C-2ab was prepared similar to Ink 1-2A$_1$ except that only 26.7 g of 1$^{st}$ Class self-dispersed carbon black Bonjet CW-2 (15.0 wt % active) was added so that the final ink contained 4% of the first class self-dispersed carbon black and 0% of the second class self-dispersed carbon black, with the total carbon black remains the same at 4%. The resulting ink has the following physical properties: a surface tension of 41.4 dynes/cm at room temperature, a viscosity of 1.6 cps at room temperature, and a pH of 8.4. The 50% and 95% particle sizes of the ink were about 176 nm and 320 nm as measured by MICROTRAC II Ultrafine particle analyzer (UPA) manufactured by Leeds & Northrup.

Comparative Ink 2a (C-2a)

Comparative Ink C-2a was prepared similar to Ink C-2ab except that only 26.7 of second self-dispersed carbon black Cabojet 300 (15 wt % active) was added so that the final ink contained 0% of the first class self-dispersed carbon black and 4.0% of the second class self-dispersed carbon black, with the total carbon black remains the same at 4%. The resulting ink has the following physical properties: a surface tension of 41 dynes/cm at room temperature, a viscosity of 1.8 cps at room temperature, and a pH of 8.4. The 50% and 95% particle sizes of the ink were about 104 nm and 209 nm as measured by MICROTRAC II Ultrafine particle analyzer (UPA) manufactured by Leeds & Northrup.

Comparative Ink 2b (C-2b)

Comparative Ink C-2b was prepared similar to Ink C-2ab except that only 26.7 of second self-dispersed carbon black X (15 wt % active) was added so that the final ink contained 0% of the first class self-dispersed carbon black and 4.0% of the second class self-dispersed carbon black, with the total carbon black remains the same at 4%. The resulting ink has the following physical properties: a surface tension of 41 dynes/cm at room temperature, a viscosity of 1.8 cps at room temperature, and a pH of 8.4. The 50% and 95% particle sizes of the ink were about 106 nm and 210 nm as measured by MICROTRAC II Ultrafine particle analyzer (UPA) manufactured by Leeds & Northrup.

Plain Paper Performance Evaluation

Inks of the present invention were filled into printer compatible empty cartridges and printing was done with a Canon i960 thermal ink jet printer. A solid area of 1 inch by 1 inch at 100% dot coverage was printed at 2 pass, bidirectional mode on 10 plain papers. The Status A reflection densities of the printed patches of all the 10 papers were measured using a spectrolino densitometer. Since the print density is very paper sensitive and the objective was lowest paper to paper variability, two parameters were chosen to be the representative print quality attributes for each ink under evaluation. They were 1) Average print density across 10 papers, and 2) Print density range (Maximum print density—minimum print density) among the 10 papers. They are listed in Table 1. The 10 papers used for evaluation were: 1) Georgia-Pacific ink jet Paper Catalog Number 214305N, 2) Kodak bright white ink jet paper, 3) Hewlett Packard Color ink jet paper, 4) Xerox Extra Bright white ink jet paper, 5) Georgia-Pacific ink jet Paper Catalog Number 999013, 6) Staples ink jet paper 7) International Paper Great White MultiUse 20 Paper, 8) Xerox Premium Multipurpose Paper, 9) Hammermill ForeMP paper, and 10) Hewlett Packard Multipurpose paper.

Jetting Performance Evaluation

Inks of the present invention were evaluated on a drop performance fixture apparatus having a thermal printhead with 640 nozzles at 1200 dpi. The operating voltage for the printhead was held at about 10 percent over the threshold voltage (minimum voltage needed to cause ejection of an ink droplet) of the printhead. The transit time for a drop of ink traveling to a distance of 0.3 mm was recorded based on the signal captured by the laser detector. The drop velocity is then calculated based on the transit time. Under the above conditions, inks of the present inventions were fired at 10,000 Hz from 4 adjacent nozzles for up to 1.5E8 firing events. Drop velocity of all the four nozzles was measured at an interval of 1E6 firing events. The drop velocity at less or equal 1E6 firing events was selected as the initial drop velocity ($V_{initial}$). The drop velocity at 1.5E8 firing events was selected as the final drop velocity ($V_{final}$). The % of velocity drop was calculated from equation: $(V_{initial}-V_{final})/V_{initial}*100$. To illustrate the synergetic effect observed when the two classes of self-dispersed carbon dispersion were mixed rather than just a simple mixing effect, a theoretical final drop velocity $V_{final}$ (linear interpolation) was calculated using the equation $V_{final}$ (linear interpolation)=(wt % Dispersion 1×$V_{final}$ (100% Dispersion 1)+wt % Dispersion 2×$V_{final}$ (100% Dispersion 2))/(wt % Dispersion 1+wt % Dispersion 2). The % of velocity drop was then calculated using the $V_{final}$ (linear interpolation). These are shown in Table 2.

TABLE 2

Print Quality And Velocity Drop for Inks In Example II

| Inks (wt % Dispersion 1-wt % Dispersion 2) | Print Quality | | Velocity Drop % | |
|---|---|---|---|---|
| | Density Range | Average Print Density | Measured | Linear interpolation of wt % of two dispersions |
| D1 = Bonjet CW-2, D2 = Cabojet 300 | | | | |
| Inventive Ink I-2A1 (3% D1-1% D2) | 0.11 | 1.48 | 25.00% | 50.00% |
| Inventive Ink I-2A$_2$ (2% D1-2% D2) | 0.12 | 1.45 | 21.90% | 34.40% |
| Comparative Ink C-2ab (4% D1-0% D2) | 0.32 | 1.49 | 62.50% | |
| Comparative Ink C-2a (0% D1-4% D2) | 0.34 | 1.32 | 12.50% | |
| D1 = Bonjet CW-2, D2 = X | | | | |
| Inventive Ink I-2B$_1$ (3% D1-1% D2) | 0.1 | 1.51 | 43.80% | 49.30% |
| Inventive Ink I-2B$_2$ (2% D1-2% D2) | 0.12 | 1.46 | 25.00% | 35.90% |
| Comparative Ink C-2ab (4% D1-0.% D2) | 0.32 | 1.49 | 62.50% | |
| Comparative Ink C-2b (0% D1-4% D2) | 0.48 | 1.25 | 9.40% | |

The above results show that the black inks with mixing of two classes self-dispersed carbon black dispersions (elements of the invention) had much improved print quality (high print density and low paper to paper variability combination) as compared to black inks with a pure self-dispersed carbon black of either class at the same total carbon black weight composition (the control elements). The above results also show that with respect to velocity drop, the black inks made from mixing two classes of self-dispersed carbon blacks have much less velocity drop, as compared to those when calculated based on simple linear interpolation. Clearly the observed advantages are synergetic, rather than just by simple mixing. These results were unexpected by the inventors.

The invention has been described in detail with particular reference to certain preferred embodiments thereof, but it will be understood that variations and modifications can be effected within the spirit and scope of the invention.

The invention claimed is:

1. An inkjet ink comprising water, a first self-dispersing pigment, and a second self-dispersing pigment, wherein said first self-dispersing pigment comprises a charged group bonded directly to the surface thereof, and said second self-dispersing pigment comprises a charged group bonded through a linking group to the surface thereof.

2. The ink of claim 1 wherein both of said first self-dispersing pigment and said second self-dispersing pigments are anionically charged.

3. The inks of claim 1 further comprising at least one humectant.

4. The ink of claim 1 further comprising at least one surfactant.

5. The ink of claim 1 wherein said first self-dispersing pigment and said second self-dispersing pigment are both carbon black pigments.

6. The ink of claim 1 wherein the weight ratio of said first self-dispersing pigment to said second self-dispersing pigment is 99:1 to 1:99.

7. The ink of claim 1 wherein the weight ratio of said first self-dispersing pigment to said second self-dispersing pigment is 98:2 to 2:98.

8. The ink of claim 1 wherein the weight ratio of said first self-dispersing pigment to said second self-dispersing pigment is 97:3 to 30:70.

9. The ink of claim 1 wherein 90 weight % of the pigment particles have a particle size of less than 2.0 microns.

10. The ink of claim 1 wherein 90 weight % of the pigment particles have a particle size of less than 200 nm.

11. The ink of claim 1 wherein the total amount of pigment is 0.1 weight % to 6.0 weight % of the ink.

12. The ink of claim 1 wherein at least one of said first and second self-dispersed pigments has a charge equivalence of at least 0.5 mEq/g.

13. The ink of claim 2 wherein at least one of the anionic self-dispersed pigments has an acid equivalence of 0.5 to 3 mEq/g.

14. The ink of claim 2 wherein the ink further comprises an ammonium counterion content of 0.01 to 0.5 percent by weight.

15. An ink jet printing method comprising the steps of:
A) Providing an ink jet printer that is responsive to digital data signals;
B) Loading said printer with an ink jet recording element;
C) Loading said printer with an aqueous ink jet ink composition;
comprising a first self-dispersing pigment, and a second self-dispersing pigment, wherein said first self-dispersing pigment comprises a charged group bonded directly to the surface thereof, and said second self-dispersing pigment comprises a charged group bonded through a linking group to the surface thereof; and
D) Applying said ink jet ink composition to said ink jet recording element in response to said digital data signals.

16. The method of claim 15 wherein said printer is a thermal ink jet printer.

17. An inkjet ink set comprising distinct cyan, magenta, yellow and black inks wherein at least one of said inks comprises an aqueous ink jet ink composition; comprising a first self-dispersing pigment, and a second self-dispersing pigment, wherein said first self-dispersing pigment comprises a charged group bonded directly to the surface thereof, and said second self-dispersing pigment comprises a charged group bonded through a linking group to the surface thereof.

18. The ink jet ink set of claim 17 wherein the ink comprising the first and second self-dispersing pigments is the black ink and the pigments are carbon black.

* * * * *